(12) United States Patent
Liang et al.

(10) Patent No.: US 11,188,171 B2
(45) Date of Patent: Nov. 30, 2021

(54) DRIVING SYSTEM, SENSING METHOD AND DRIVING CIRCUIT FOR TOUCH DISPLAY DEVICE

(71) Applicant: NOVATEK Microelectronics Corp., Hsin-Chu (TW)

(72) Inventors: Keko-Chun Liang, Hsinchu (TW); Yi-Yang Tsai, Hsinchu County (TW); Jin-Yi Lin, Kaohsiung (TW); Chun-Wei Kang, Hsinchu (TW); Yi-Chuan Liu, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 16/784,176

(22) Filed: Feb. 6, 2020

(65) Prior Publication Data

US 2021/0072859 A1 Mar. 11, 2021

Related U.S. Application Data

(60) Provisional application No. 62/897,384, filed on Sep. 8, 2019.

(51) Int. Cl.
*G06F 3/041* (2006.01)

(52) U.S. Cl.
CPC .................. *G06F 3/0416* (2013.01)

(58) Field of Classification Search
CPC .............................. G06F 3/041; G06F 3/0416
See application file for complete search history.

(56) References Cited

U.S. PATENT DOCUMENTS

| 8,766,950 | B1 | 7/2014 | Morein | |
|---|---|---|---|---|
| 2015/0091849 | A1* | 4/2015 | Ludden | ................ G06F 3/0412 345/174 |
| 2016/0188107 | A1 | 6/2016 | Shepelev | |
| 2016/0328072 | A1 | 11/2016 | Yang | |
| 2018/0004327 | A1 | 1/2018 | Ludden | |
| 2020/0097112 | A1* | 3/2020 | Seo | ....................... G06F 3/0412 |

FOREIGN PATENT DOCUMENTS

TW 201344766 A 11/2013

* cited by examiner

*Primary Examiner* — Kenneth B Lee, Jr.
(74) *Attorney, Agent, or Firm* — Winston Hsu

(57) ABSTRACT

A driving system for a touch display device includes a timing controller, configured to output a plurality of first data and receive a plurality of second data; and a driving module, coupled to the timing controller, comprises a display driving module, configured to output a plurality of output voltages according to the plurality of first data output by the timing controller; and a sensing module, configured to receive a plurality of display sensing data and a plurality of touch sensing data to generate the plurality of second data to the timing controller.

24 Claims, 6 Drawing Sheets

DRIVING SYSTEM, SENSING METHOD AND DRIVING CIRCUIT FOR TOUCH DISPLAY DEVICE

CROSS REFERENCE TO RELATED APPLICATIONS

This application claims the benefit of U.S. Provisional Application No. 62/897,384 filed on 2019 Sep. 8, the contents of which are incorporated herein in their entirety.

BACKGROUND OF THE INVENTION

1. Field of the Invention

The present invention relates to a driving system, a sensing method and a driving circuit for a touch display device, and more particularly, to a driving system, a sensing method and a driving circuit for a touch display device capable of integrating a display sensing circuit and a touch sensing circuit of the touch display device.

2. Description of the Prior Art

Please refer to FIG. 1, which is a schematic diagram of a conventional organic light-emitting diode (OLED) display system 10. The OLED display system 10 includes a timing controller and a driver integrated circuit (IC), wherein the driver IC includes a display sensing circuit for detecting OLED and thin-film transistor (TFT), and the timing controller includes a compensation algorithm circuit for the OLED and the TFT.

Please refer to FIGS. 2 and 3, which are schematic diagrams of conventional touch systems 20 and 30 for the display system 10. The conventional touch system 20 includes a touch controller IC, which includes a touch sensing circuit and executes an algorithm for eliminating noises and extracting coordinates of a touch device. Different with the conventional touch system 20, a touch sensing circuit of the conventional touch system 30 is integrated in the driver IC of the display system 10.

However, when the OLED display system 10 is integrated with the touch system, extra analog front end (AFE) circuit and analog-to-digital circuit (ADC) for display sensing and touch sensing are included in the driver IC of the touch system or the touch controller IC of the touch system. Redundant hardware circuits are included therein, which increases the cost of the display system. Therefore, improvements are necessary to the conventional system.

SUMMARY OF THE INVENTION

The present invention provides a driving system, a sensing method and a driving circuit for a touch display device to integrate a structure of a display sensing circuit and a touch sensing circuit of the touch display device.

An embodiment of the present invention discloses a driving system for a touch display device, comprises a timing controller, configured to output a plurality of first data and receive a plurality of second data; and a driving module, coupled to the timing controller, comprises a display driving module, configured to output a plurality of output voltages according to the plurality of first data output by the timing controller; and a sensing module, configured to receive a plurality of display sensing data and a plurality of touch sensing data to generate the plurality of second data to the timing controller.

Another embodiment of the present invention discloses a sensing method, for a touch display device, comprises sensing a plurality of touch sensing data during a first period within a frame time of a display of the touch display device; and sensing a plurality of display sensing data during a second period within the frame time of the display of the touch display device; wherein the first period does not overlap with the second period within the frame time.

Another embodiment of the present invention discloses a driving circuit for a touch display device having a timing controller for outputting a plurality of first data and receiving a plurality of second data, comprises a display driving circuit, configured to output a plurality of output voltages according to the plurality of first data output by the timing controller; and a sensing circuit, configured to receive a plurality of display sensing data and a plurality of touch sensing data to generate the plurality of second data to the timing controller.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 8 is a timing diagram of sensing method for an on-cell touch device or an add-on touch device according to an embodiment of the present invention.

DETAILED DESCRIPTION

Figure 1:
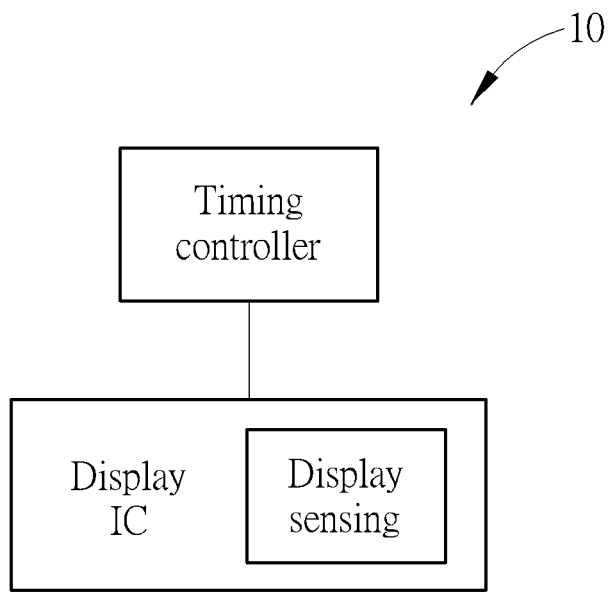
FIG. 1 is a schematic diagram of a conventional organic light-emitting diode (OLED) display system.
Figure 2:
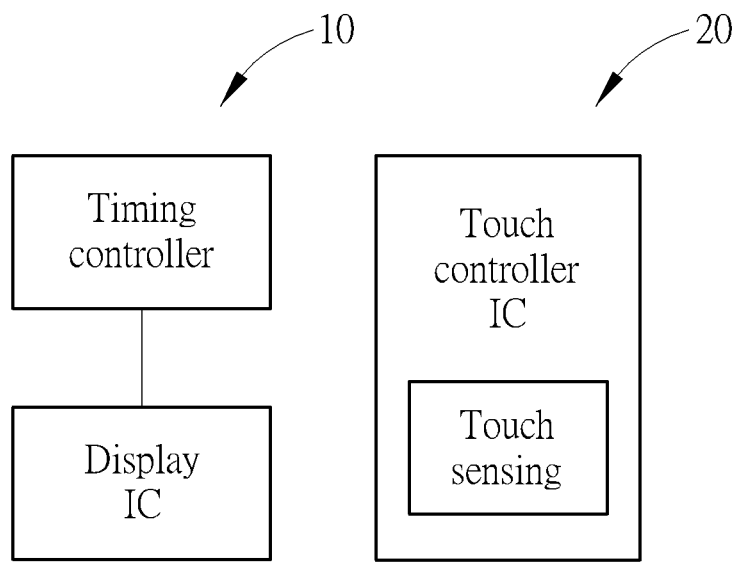
FIGS. 2 and 3 are schematic diagrams of conventional touch systems for the display system.
Figure 3:
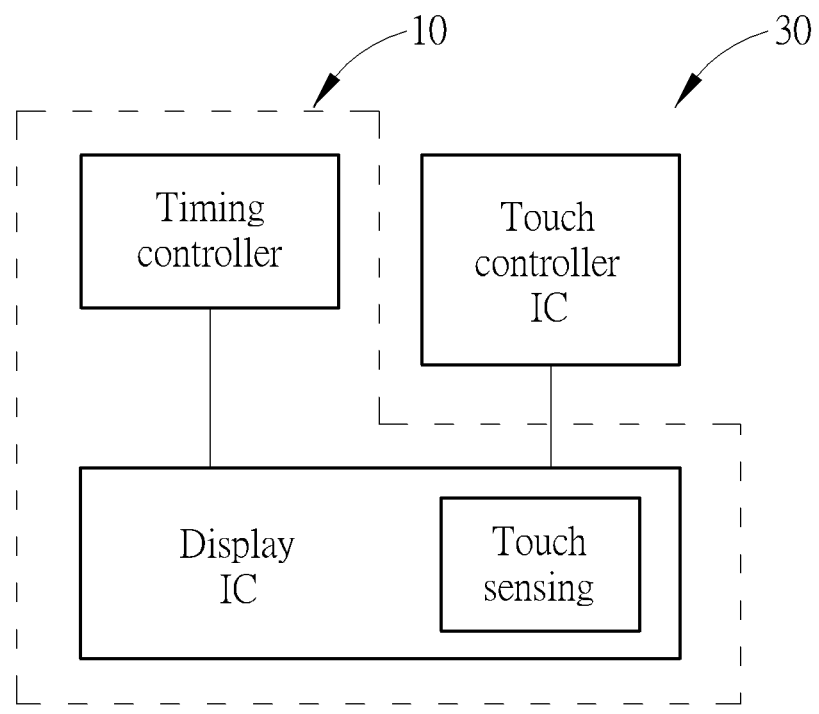
Figure 4:
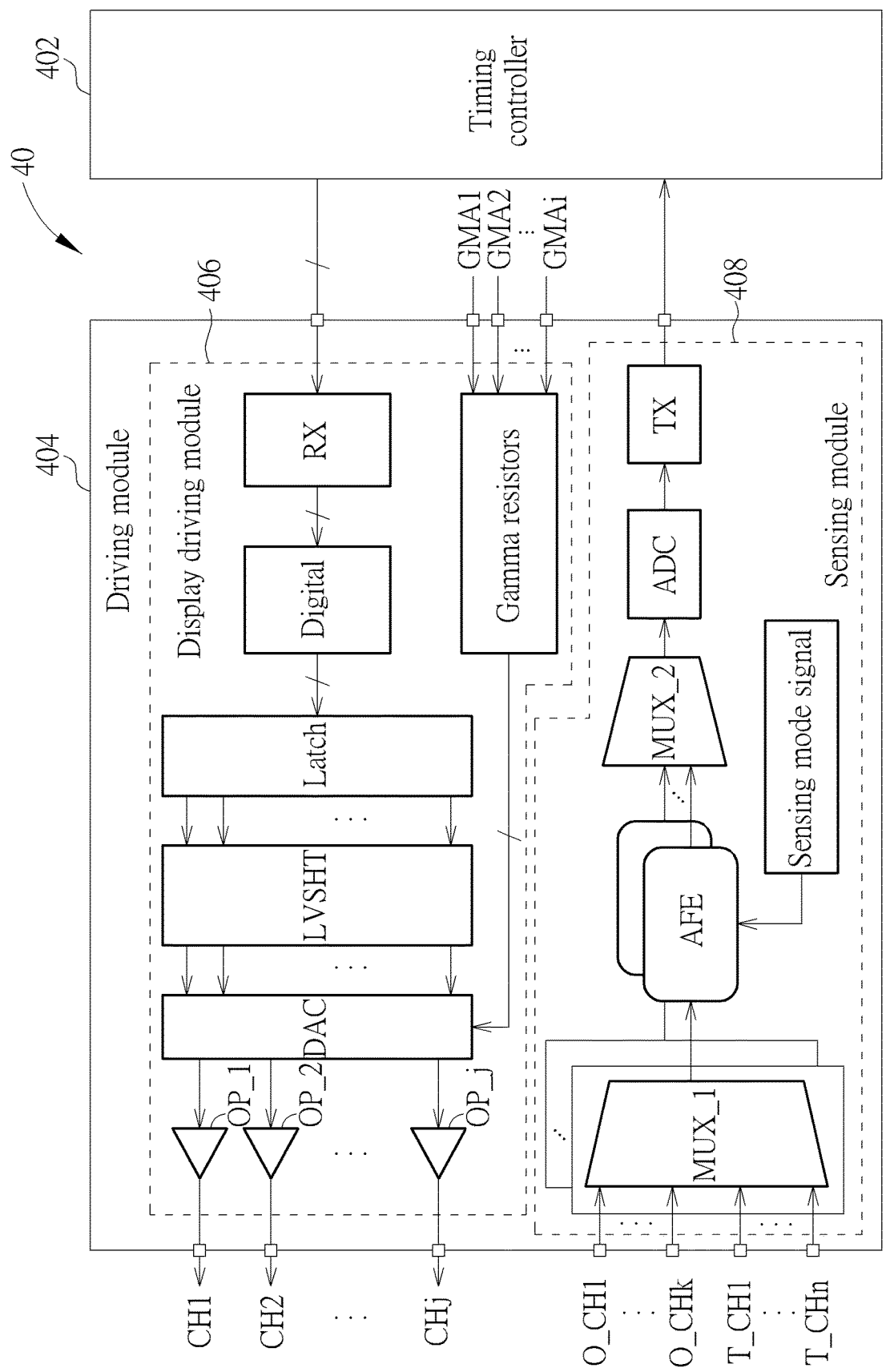
FIG. 4 is a schematic diagram of a driving system according to an embodiment of the present invention.

Please refer to FIG. 4, which is a schematic diagram of a driving system 40 according to an embodiment of the present invention. The driving system 40 may be utilized for a touch display device (not depicted in FIG. 4), and includes a timing controller 402 and a driving module 404. The touch display device may include a touch device and a display, wherein the touch device may be an in-cell touch device, on-cell touch device or an add-on touch device, and the display of the touch display device may be an organic light-emitting diode (OLED) display or a thin film transistor liquid crystal display (TFT-LCD). The timing controller 402 is configured to output a plurality of first data and receive a plurality of second data and to perform a compensation method for displaying and a coordination extraction for touch sensing according to the second data. The driving module 404 includes a display driving module 406 and a sensing module 408. The display driving module 406 is configured to output a plurality of output voltages CH1-CHj according to the first data output by the timing controller 402. For example, output voltages CH1-CHj are outputted to the OLED display or the TFT-LCD display for displaying. The sensing module 408 is configured to receive a plurality of display sensing data O_CH1-O_CHk from the display and a plurality of touch sensing data T_CH1-TCHn from the touch device, to generate the second data to the timing controller 402. In an example, the sensing module 408 is configured to sense the display sensing data O_CH1-O_CHk and the touch sensing data T_CH1-TCHn with a time-division multiplexing method. Therefore, the sensing module 408 of the present invention integrates a system structure of the driving system 40 to receive the display sensing data and the touch sensing data, such that a hardware cost is reduced.

In an embodiment, the display driving module 406 may further include a plurality of operational (OP) output buffers OP 1-OP j, a digital-to-analog (DAC) circuit, a level shifter LVSHT, a latch, a digital block and a receiver, to receive the first data from the timing controller 402 and then output the output voltages CH1-CHj to the display, e.g. the OLED or the TFT-LCD display. In addition, a plurality of Gamma resistors (or Gamma resistors and buffers) are connected to the DAC circuit and individually optimized to a plurality of Gamma inputs GMA1-GMAi.

The sensing module 408 includes a plurality of first multiplexers MUX_1, a plurality of analog front end (AFE) circuits, a second multiplexer MUX_2, an analog-to-digital converter (ADC) circuit ADC and a transmitter TX. The first multiplexers MUX_1 are configured to receive the display sensing data O_CH1-O_CHk from the OLED display and the touch sensing data T_CH1-TCHn from the touch device and then switch outputting the display sensing data O_CH1-O_CHk and the touch sensing data T_CH1-TCHn by the time-division multiplexing method. In an embodiment, the display sensing data O_CH1-O_CHk may be sensed during a vertical blanking period or a plurality of horizontal blanking periods of the display, and the touch sensing data T_CH1-TCHn are sensed during the vertical-blanking period of the display, such that the display sensing data O_CH1-O_CHk and the touch sensing data T_CH1-TCHn are multiplexed by the first multiplexers MUX_1 with the time-division multiplexing method.

The AFE circuits, which are connected to the first multiplexers MUX_1, are configured to receive the display sensing data O_CH1-O_CHk or the touch sensing data T_CH1-TCHn based on a sensing mode signal. More specifically, the sensing mode signal is related to the output of the first multiplexers MUX_1. When the sensing mode signal indicates to receive the display sensing data O_CH1-O_CHk based on the time-division multiplexing method, the first multiplexers MUX_1 is switched to receive the display sensing data O_CH1-O_CHk; when the sensing mode signal indicates to receive the touch sensing data T_CH1-TCHn based on the time-division multiplexing method, the first multiplexers MUX_1 is switched to receive the touch sensing data T_CH1-TCHn.

The second multiplexer MUX_2 is configured to switch outputting the plurality of display sensing data or the plurality of touch sensing data to the ADC circuit. The ADC circuit is configured to convert the display sensing data O_CH1-O_CHk or the touch sensing data T_CH1-TCHn from the AFE circuits into a plurality of digital display sensing data or a plurality of digital touch sensing data. The transmitter TX is coupled to the ADC circuit and configured to transmit the digital display sensing data or the digital touch sensing data to the timing controller 402. As such, the AFE circuits, the second MUX_2, the ADC circuit and the transmitter TX may be shared in the sensing module 408 for the display sensing and the touch sensing.

Figure 5:
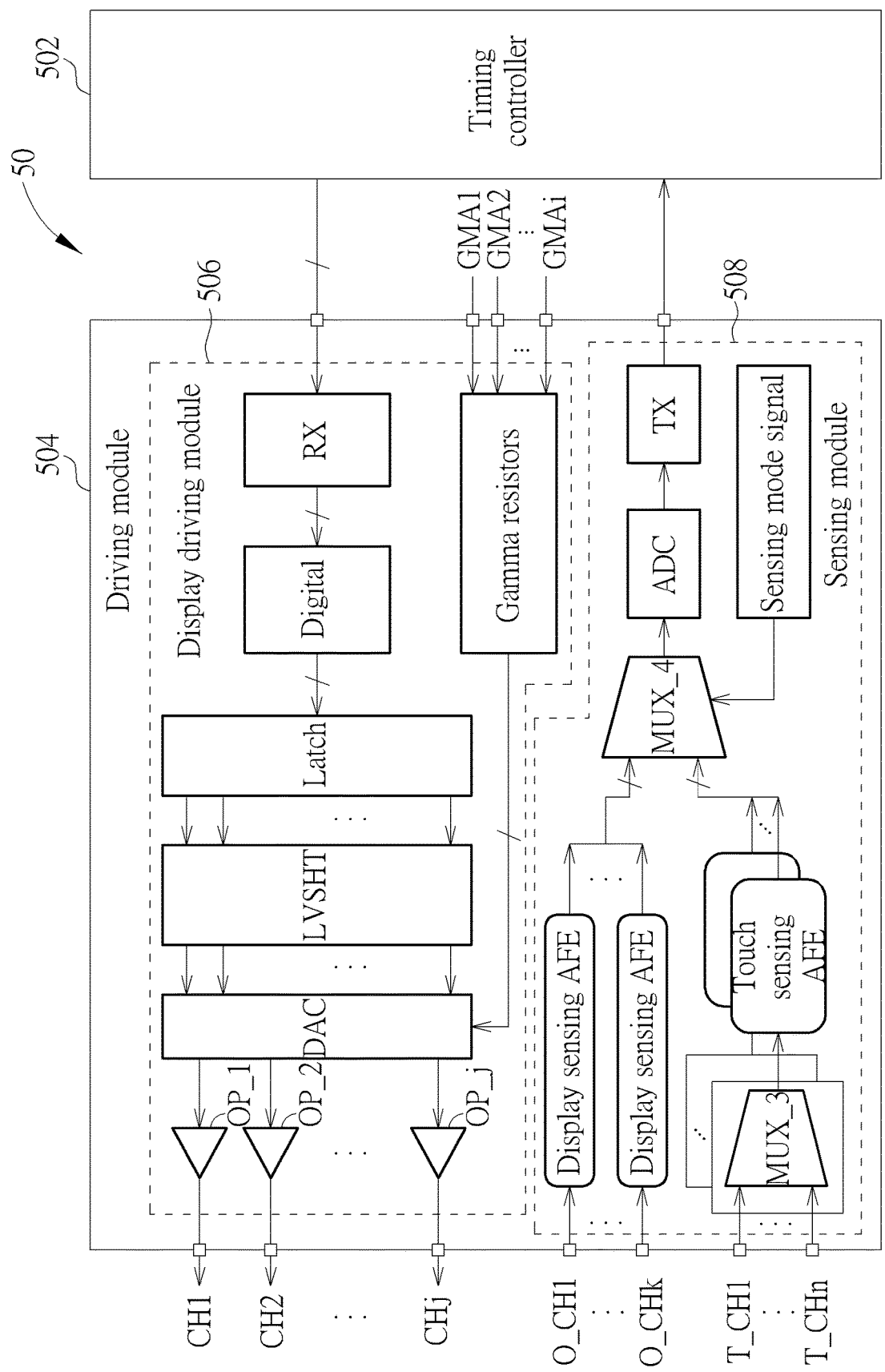
FIG. 5 is a schematic diagram of a driving system according to another embodiment of the present invention.

In another embodiment, please refer to FIG. 5, which is a schematic diagram of a driving system 50 according to another embodiment of the present invention. The driving system 50 may be utilized for a touch display device (not depicted in FIG. 5), and includes a timing controller 502 and a driving module 504. The timing controller 502 is configured to output a plurality of first data and receive a plurality of second data and to perform a compensation method for displaying and a coordination extraction for touch sensing according to the second data. The driving module 504 includes a display driving module 506 and a sensing module 508. The display driving module 506 inherits functions of the display driving module 406, shares the same reference signs with the display driving module 406, and is not narrated again for brevity. Different with driving system 40, the sensing module 508 of the driving system 50 shares an ADC circuit and a transmitter to reduce the hardware cost.

In detail, the sensing module 508 includes a plurality of display sensing analog front end (AFE) circuits to respectively receive the display sensing data O_CH1-O_CHk. Furthermore, the sensing module 508 includes a plurality of third multiplexers MUX_3 to respectively receive the touch sensing data T_CH1-TCHn, and then a plurality of touch sensing analog front end (AFE) circuits are configured to receive the touch sensing data T_CH1-TCHn from the third multiplexers MUX_3. A forth multiplexer MUX_4 of the sensing module 508 performs a time-division multiplexing method for the received display sensing data O_CH1-O_CHk and the touch sensing data T_CH1-TCHn based on a sensing mode signal, wherein the sensing mode signal is related to the output of the forth multiplexers MUX_4. For example, when the sensing mode signal indicates to receive the display sensing data O_CH1-O_CHk based on the time-division multiplexing method, the forth multiplexers MUX_4 is switched to receive the display sensing data O_CH1-O_CHk; when the sensing mode signal indicates to receive the touch sensing data T_CH1-TCHn based on the time-division multiplexing method, the forth multiplexers MUX_4 is switched to receive the touch sensing data T_CH1-TCHn.

After the forth multiplexer MUX_4 outputs the display sensing data O_CH1-O_CHk or the touch sensing data T_CH1-TCHn to the ADC circuit, the ADC circuit converts the display sensing data O_CH1-O_CHk or the touch sensing data T_CH1-TCHn from the AFE circuits into a plurality of digital display sensing data or a plurality of digital touch sensing data. The transmitter TX of the driving module 508 is coupled to the ADC circuit and configured to transmit the digital display sensing data or the digital touch sensing data to the timing controller 502. In an embodiment, the display sensing data O_CH1-O_CHk may be sensed during the vertical blanking period or the horizontal blanking periods of the display, and the touch sensing data T_CH1-TCHn are sensed during the vertical-blanking period of the display, such that the display sensing data O_CH1-O_CHk and the touch sensing data T_CH1-TCHn are multiplexed by the forth multiplexer MUX_4 with the time-division multiplexing method. As such, the ADC circuit and the transmitter TX may be shared in the sensing module 508 to reduce the hardware cost.

Figure 6:
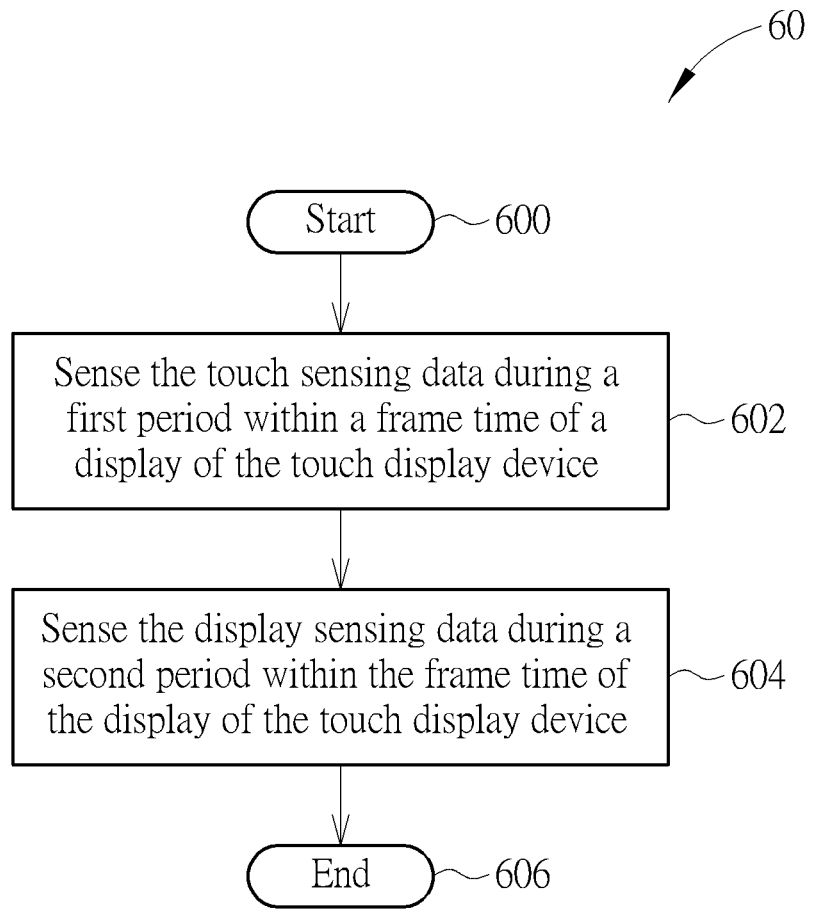
FIG. 6 is a schematic diagram of a sensing process according to another embodiment of the present invention.

The sensing method for the touch display device in the above examples can be summarized into a sensing process 60 shown in FIG. 6. The sensing process 60 includes the following steps:

Step 600: Start.

Step 602: Sense the touch sensing data during a first period within a frame time of a display of the touch display device.

Step 604: Sense the display sensing data during a second period within the frame time of the display of the touch display device.

Step 606: End.

Figure 7:
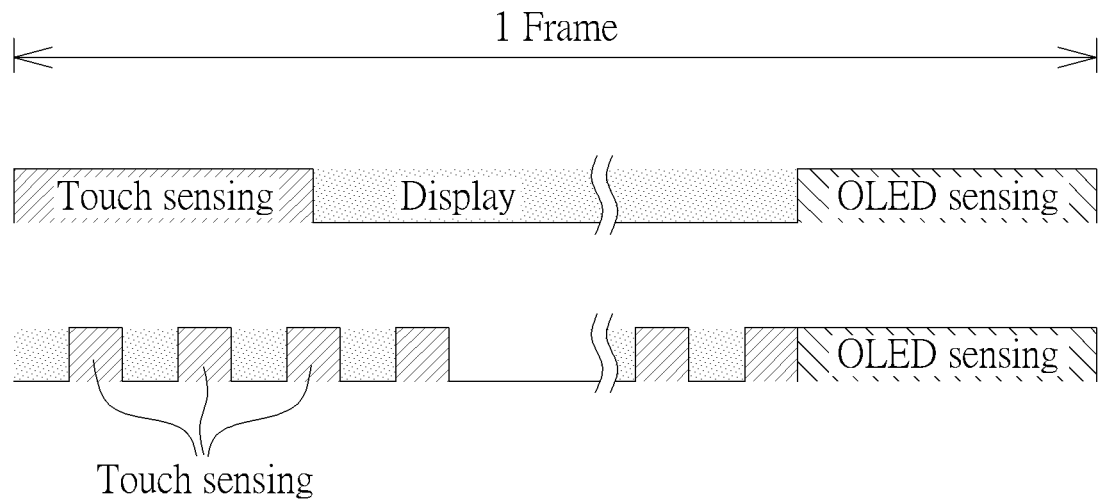
FIGS. 7 and 8 are timing diagrams of sensing method for an in-cell touch display with an OLED display according to an embodiment of the present invention.

Based on the sensing process 60, assume that the touch display device is an in-cell touch device with an OLED display, a timing diagram of the sensing method is illustrated in FIG. 7. As show in the upper part of FIG. 7, when the first period is a vertical blanking period of the display of the touch display device, the touch sensing data are sensed during the vertical blanking period, the voltages of the display are then outputted for displaying and the OLED sensing is performed with the time-division multiplexing method within one frame time of the display of the touch display device.

In the lower part of FIG. 7, when the first period includes a plurality of horizontal blanking periods of the display of the touch display device, the touch sensing data are sensed during the horizontal blanking periods, the voltages of the display are respectively outputted between the horizontal blanking periods and the OLED sensing is performed with the time-division multiplexing method within one frame time of the display of the touch display device.

Figure 8:
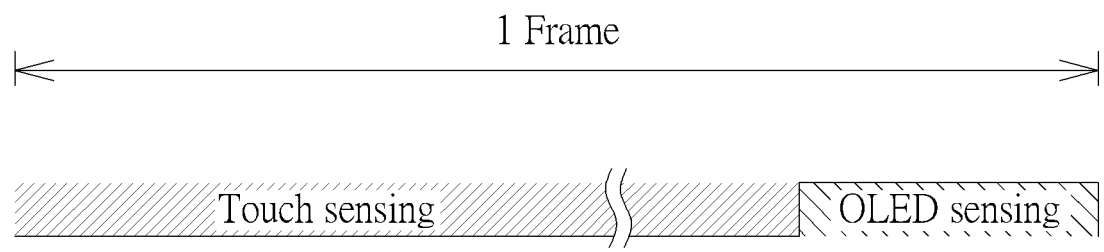

In another embodiment, assume that the touch display device is an on-cell touch device or an add-on touch device, a timing diagram of the sensing method is illustrated in FIG. 8. In this situation, the touch sensing and the OLED sensing are performed with the time-division multiplexing method.

Therefore, the driving module of the present invention integrates the display sensing and the touch sensing to reduce the hardware cost. Moreover, those skilled in the art may properly design the driving module according to different requirements, e.g. the display driving module is not limited to above embodiments and is applicable to the present invention.

In summary, the present invention provides a driving system for a touch display device and a sensing method thereof, which integrates a structure of a display sensing circuit and a touch sensing circuit of the touch display device to reduce a hardware cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driving system for a touch display device, wherein the touch display device comprises a touch device and a display, the driving system comprising:
   a timing controller, configured to output a plurality of first data and receive a plurality of second data; and
   a driving module, coupled to the timing controller, comprising:
      a display driving module, configured to output a plurality of output voltages to the display of the touch display device according to the plurality of first data output by the timing controller; and
      a sensing module, configured to receive a plurality of display sensing data from the display of the touch display device and a plurality of touch sensing data from the touch device to generate the plurality of second data to the timing controller.

2. The driving system of claim 1, wherein the plurality of display sensing data are sensed during a vertical blanking period or a plurality of horizontal blanking periods of a display of the touch display device, and the plurality of touch sensing data are sensed during the vertical-blanking period of the display.

3. The driving system of claim 2, wherein during the vertical-blanking period of the touch display device, the plurality of display sensing data and the plurality of touch sensing data are sensed by a time-division multiplexing method.

4. The driving system of claim 1, wherein the timing controller is configured to perform a compensation method for displaying and a coordination extraction for touch sensing according to the plurality of second data.

5. The driving system of claim 1, wherein the sensing module comprises:
   a plurality of first multiplexers, configured to receive and switch outputting the plurality of display sensing data and the plurality of touch sensing data by a time-division multiplexing method.

6. The driving system of claim 5, wherein the sensing module further comprises:
   a plurality of analog front end (AFE) circuits, configured to receive the plurality of display sensing data or the plurality of touch sensing data from the plurality of multiplexers based on a sensing mode signal;
   a second multiplexer, configured to switch outputting the plurality of display sensing data or the plurality of touch sensing data;
   an analog to digital converter (ADC) circuit, configured to convert the plurality of display sensing data or the plurality of touch sensing data from the plurality of AFE circuits into a plurality of digital display sensing data or a plurality of digital touch sensing data; and
   a transmitter, coupled to the ADC circuit and configured to transmit the plurality of digital display sensing data or the plurality of digital touch sensing data to the timing controller;
   wherein the sensing mode signal is related to an output of the plurality of first multiplexers.

7. The driving system of claim 1, wherein the sensing module comprises:
   a plurality of display sensing analog front end (AFE) circuits, configured to receive the plurality of display sensing data;
   a plurality of third multiplexers, configured to receive the plurality of touch sensing data;
   a plurality of touch sensing analog front end (AFE) circuits, coupled to the plurality of third multiplexers and configured to receive the plurality of touch sensing data from the plurality of third multiplexers; and
   a forth multiplexer, coupled to the plurality of display sensing AFE circuits and the plurality of touch sensing AFE circuits, and configured to output the plurality of display sensing data or the plurality of touch sensing data based on a sensing mode signal.

8. The driving system of claim 7, wherein the sensing module further comprises:
   an analog to digital converter (ADC) circuit, coupled to the forth multiplexer, and configured to convert the plurality of display sensing data or the plurality of touch sensing data from the forth multiplexer into a plurality of digital display sensing data or a plurality of digital touch sensing data; and a transmitter, coupled to the ADC circuit, and configured to transmit the plurality of digital display sensing data or the plurality of digital touch sensing data to the timing controller.

9. The driving system of claim 1, wherein a display of the touch display device is an organic light-emitting diode (OLED) display or a thin film transistor (TFT) liquid crystal display (LCD).

10. A sensing method, for a touch display device, comprising:
sensing a plurality of touch sensing data during a first period within a frame time of a display of the touch display device; and
sensing a plurality of display sensing data during a second period within the frame time of the display of the touch display device;
wherein the first period does not overlap with the second period within the frame time.

11. The sensing method of claim 10, further comprising:
outputting a plurality of voltages to the display of the touch display device for displaying.

12. The sensing method of claim 11, wherein the first period is a vertical blanking period of the display of the touch display device, or the first period comprises a plurality of horizontal blanking periods of the display of the touch display device.

13. The sensing method of claim 11, wherein the display of the touch display device is an in-cell touch display device.

14. The sensing method of claim 10, wherein the first period is a vertical blanking period of the display of the touch display device.

15. The sensing method of claim 14, wherein the display of the touch display device is an on-cell touch display device or an add-on touch display device.

16. A driving circuit for a touch display device having a timing controller for outputting a plurality of first data and receiving a plurality of second data, wherein the touch display device comprises a touch device and a display, the driving circuit comprising:
a display driving circuit, configured to output a plurality of output voltages to the display of the touch display device according to the plurality of first data output by the timing controller; and
a sensing circuit, configured to receive a plurality of display sensing data from the display of the touch display device and a plurality of touch sensing data from the touch device to generate the plurality of second data to the timing controller.

17. The driving circuit of claim 16, wherein the plurality of display sensing data are sensed during a vertical blanking period or a plurality of horizontal blanking periods of a display of the touch display device, and the plurality of touch sensing data are sensed during the vertical-blanking period of the display.

18. The driving circuit of claim 17, wherein during the vertical-blanking period of the touch display device, the plurality of display sensing data and the plurality of touch sensing data are sensed by a time-division multiplexing method.

19. The driving circuit of claim 16, wherein the timing controller is configured to perform a compensation method for displaying and a coordination extraction for touch sensing according to the plurality of second data.

20. The driving circuit of claim 16, wherein the sensing circuit comprises:
a plurality of first multiplexers, configured to receive and switch outputting the plurality of display sensing data and the plurality of touch sensing data by a time-division multiplexing method.

21. The driving circuit of claim 20, wherein the sensing circuit further comprises:
a plurality of analog front end (AFE) circuits, configured to receive the plurality of display sensing data or the plurality of touch sensing data from the plurality of multiplexers based on a sensing mode signal;
a second multiplexer, configured to switch outputting the plurality of display sensing data or the plurality of touch sensing data;
an analog to digital converter (ADC) circuit, configured to convert the plurality of display sensing data or the plurality of touch sensing data from the plurality of AFE circuits into a plurality of digital display sensing data or a plurality of digital touch sensing data; and
a transmitter, coupled to the ADC circuit and configured to transmit the plurality of digital display sensing data or the plurality of digital touch sensing data to the timing controller;
wherein the sensing mode signal is related to an output of the plurality of first multiplexers.

22. The driving circuit of claim 16, wherein the sensing circuit comprises:
a plurality of display sensing analog front end (AFE) circuits, configured to receive the plurality of display sensing data;
a plurality of third multiplexers, configured to receive the plurality of touch sensing data;
a plurality of touch sensing analog front end (AFE) circuits, coupled to the plurality of third multiplexers and configured to receive the plurality of touch sensing data from the plurality of third multiplexers; and
a forth multiplexer, coupled to the plurality of display sensing AFE circuits and the plurality of touch sensing AFE circuits, and configured to output the plurality of display sensing data or the plurality of touch sensing data based on a sensing mode signal.

23. The driving circuit of claim 22, wherein the sensing circuit further comprises:
an analog to digital converter (ADC) circuit, coupled to the forth multiplexer, and configured to convert the plurality of display sensing data or the plurality of touch sensing data from the forth multiplexer into a plurality of digital display sensing data or a plurality of digital touch sensing data; and
a transmitter, coupled to the ADC circuit, and configured to transmit the plurality of digital display sensing data or the plurality of digital touch sensing data to the timing controller.

24. The driving circuit of claim 16, wherein a display of the touch display device is an organic light-emitting diode (OLED) display or a thin film transistor (TFT) liquid crystal display (LCD).

* * * * *